Nov. 7, 1933.  G. H. STONER  1,934,246

BRAKE

Filed Nov. 2, 1931

INVENTOR:
George H. Stoner
by MacLeod, Calver, Copeland & Dike
Attys.

Patented Nov. 7, 1933

1,934,246

UNITED STATES PATENT OFFICE 1,934,246

BRAKE

George H. Stoner, Boston, Mass., assignor to Stoner-Ames Brake Company, Inc., Boston, Mass., a corporation of Massachusetts Application November 2, 1931. Serial No. 572,513

2 Claims. (Cl. 188—140)

This invention relates to vehicle brakes and has for its object the provision of mechanism operative, when the brake operating mechanism is actuated by the vehicle operator, to actuate the brake operating mechanism by a force derived from the motor of the vehicle.

Before explaning in detail the present invention, it is to be understood that the invention is not limited in its application to the details of construction and arrangement of parts illustrted in the accompanying drawing, since the invention is capable of other embodiments and of being practiced or carried out in various ways. Also it is to be understood that the phaseology or terminology employed herein is for the purpose of description and not of limitation, and it is not intended to limit the invention beyond the terms of the several claims hereto appended as considered in view of the prior art and the requirements thereof.

The invention will be more clearly understood from the following description in conjunction with the accompanying drawing: in which, Fig. 1 is a plan view of a vehicle chassis in which is incorporated one embodiment of the invention;

Figure 1:
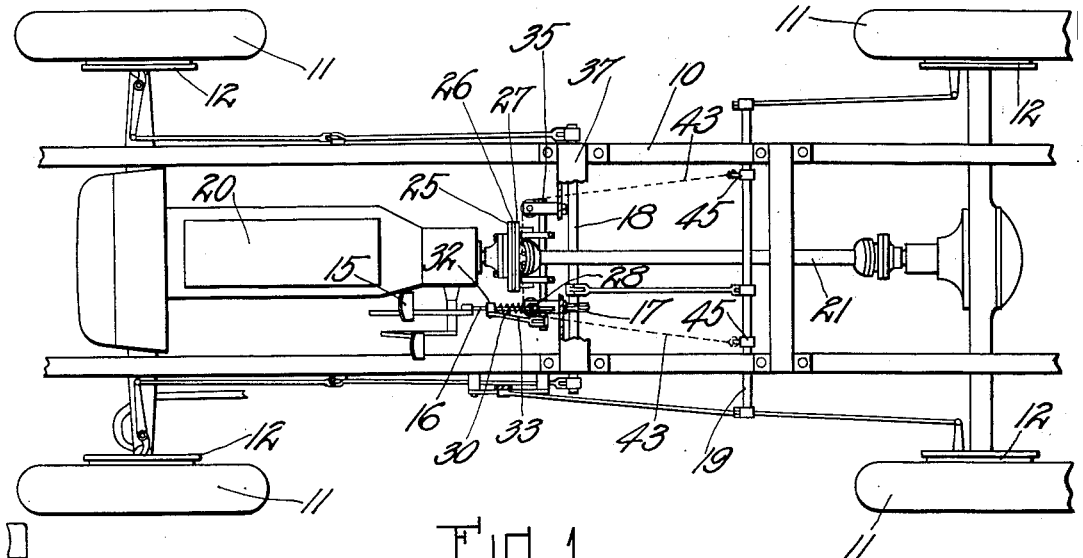
Figure 2:
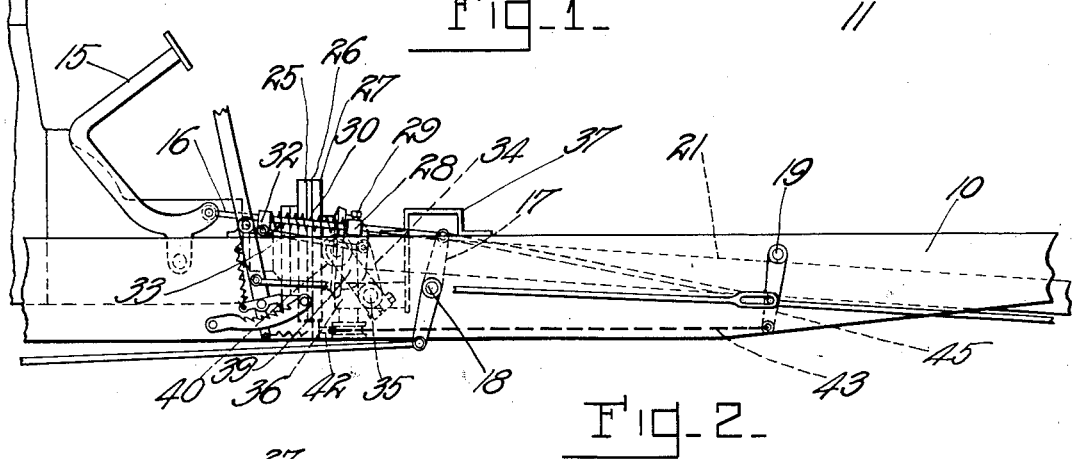
Fig. 2 is a fragmentary elevational view of the same.
Figures 3, 4:
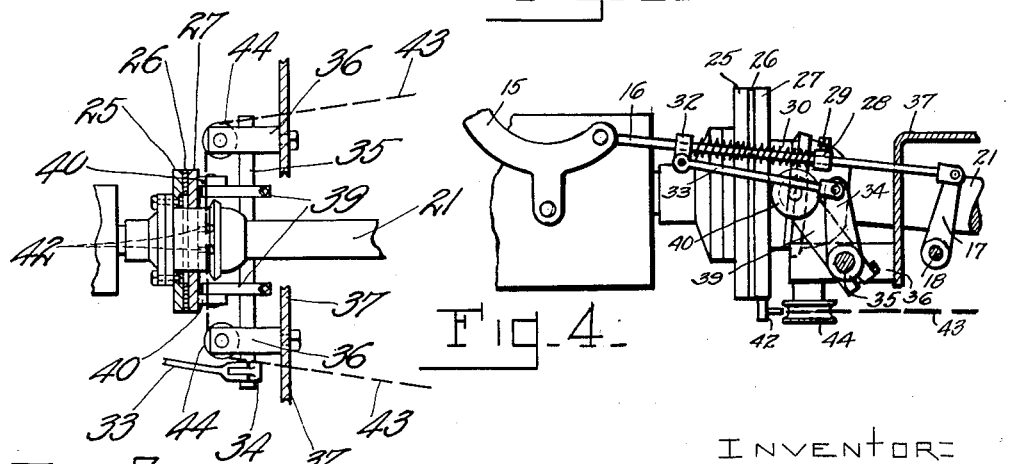
Fig. 3 is a fragmentary plan view of the same.
Fig. 4 is an enlarged elevational view of a portion of the structure shown in Fig. 2.

One embodiment of the invention is illustrated in the accompanying drawing wherein is shown a vehicle having a chassis frame 10 supported upon suitable wheels 11 each having a brake 12. Each of the brakes is actuated by any suitable well known brake operating mechanism including a pivotally mounted brake pedal 15 to which one end of a rod 16 is pivotally connected. The other end of the rod 16 is pivotally connected to an arm 17 fixed upon a shaft 18 mounted for rotation in suitable bearings carried by the chassis frame 10 and operatively connected to the front wheel brakes. The shaft 18 is operatively connected in any suitable manner to a shaft 19 mounted for rotation in suitable bearings carried by the frame 10 and operatively connected to the brakes for the rear wheels of the vehicle. The rear wheels of the vehicle are rotated to move the vehicle by a motor 20 through suitable mechanism including a drive shaft 21.

In accordance with the present invention, mechanism is provided for applying power for operating the vehicle brakes when the brake operating mechanism is actuated by the operator. For this purpose, in the embodiment of the invention illustrated, a disc 25 is suitably secured upon the drive shaft 21 and is provided with a suitable friction surface, such as a brake lining 26. A second disc 27 is mounted upon the drive shaft 21 for axial and rotative movement thereon. A collar 28 is adjustably secured upon the rod 16, as by a set screw 29. A spring 30 surrounds the rod 16 with one end in engagement with the collar 28 and its other end engaging a collar 32 slidably mounted upon the rod 16. One end of a link 33 is pivotally connected to the collar 32 and its other end is pivotally connected to a lever 34 fixed upon a shaft 35 which is rotatably mounted in suitable bearings 36 carried by a cross member 37 forming a part of the chassis frame. One or more arms 39 are fixed upon the shaft 35 and each is provided at its free end with a roll 40 adapted to engage the disc 27. The disc 27 is provided with a pair of pins 42 to each of which a flexible cable 43 is secured. Each of the cables 43 passes over a pulley 44 rotatably carried upon the bearings 36 and is connected to a separate lever 45 secured upon the shaft 19.

When the operator depresses the brake pedal 15, the collar 28 carried by the rod 16 is moved forwardly compressing the spring 30 which causes the slidable collar 32 and link 33 to move forwardly and rotate the lever 34 and shaft 35 counterclockwise thereby bringing each of the rolls 40 into engagement with the disc 27 to move the latter into engagement with the friction material 26 carried by the disc 25. As a result, the disc 27 is rotated to apply tension to one or the other of the flexible cables 43 to rotate the shaft 19 and actuate the brake operating mechanism. In this manner the power applied to the brake foot pedal 15 by the operator to actuate the brake operating mechanism is supplemented by power supplied by the drive shaft 21.

I claim:

1. A vehicle having a power driven shaft and a brake operated mechanism adapted to be actuated by the vehicle operator including a brake rod, the combination therewith of means for causing said shaft to actuate said mechanism to supplement the actuation of said mechanism by the operator comprising a movable member, means for causing said member to be moved by the rotation of said shaft when said rod has been moved a predetermined amount by the operator including a lever, spaced collars carried by said rod, one of which is fixed thereon and the other of which is movable relative thereto, and operative connections between said lever and movable collar, and means for operatively connecting said member and mechanism.

2. A vehicle having a power driven shaft and a brake operated mechanism adapted to be actuated by the vehicle operator including a brake rod, the combination therewith of means for causing said shaft to actuate said mechanism to supplement the actuation of said mechanism by the operator comprising a movable member, means for causing said member to be moved by the rotation of said shaft when said rod has been moved a predetermined amount by the operator including a lever, spaced collars carried by said rod, one of which is fixed thereon and the other of which is movable relative thereto, operative connections between said lever and movable collar, and resilient means operatively connecting said collars, and means for operatively connecting said member and mechanism.

GEORGE H. STONER.